US006443474B1

(12) United States Patent
Kay

(10) Patent No.: US 6,443,474 B1
(45) Date of Patent: *Sep. 3, 2002

(54) HIGH STRENGTH EXTENDED LENGTH TRAILER HITCH

(75) Inventor: Jon D. Kay, Maple Valley, WA (US)

(73) Assignees: Jack Kay, Kent, WA (US); Anthony Kay, Kent, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/442,402

(22) Filed: Nov. 17, 1999

Related U.S. Application Data

(63) Continuation-in-part of application No. 09/329,961, filed on Jun. 9, 1999, now Pat. No. 6,173,984.

(51) Int. Cl.⁷ .................................................. B60D 1/58
(52) U.S. Cl. ..................... 280/457; 280/495; 280/491.5; 280/504
(58) Field of Search ................................ 280/504, 477, 280/478.1, 482, 491.1, 491.5, 495, 497, 500, 507, 457; 248/316.8

(56) References Cited

U.S. PATENT DOCUMENTS

| 2,176,878 A | 10/1939 | Arehart | 280/33.44 |
|---|---|---|---|
| 2,320,046 A | 5/1943 | Notar | 280/33.44 |
| 2,554,711 A | 5/1951 | Lowman | 280/33.44 |
| 3,428,336 A | 2/1969 | Thurman | 280/482 |
| 3,462,173 A | 8/1969 | Bock | 280/484 |
| 3,490,788 A | 1/1970 | Mann | 280/406 |
| 3,578,358 A | 5/1971 | Reynolds | 280/500 |
| 3,649,049 A * | 3/1972 | Woodke, III | 280/502 |
| 3,730,556 A | 5/1973 | Aldape et al. | 280/500 |
| 3,768,837 A | 10/1973 | Reese | 280/495 |
| 4,050,714 A | 9/1977 | Epp | 280/495 |
| 4,202,562 A | 5/1980 | Sorenson | 280/415 R |
| 4,398,743 A | 8/1983 | Belsky et al. | 280/495 |
| 4,761,015 A | 8/1988 | Carr | 280/402 |
| 5,011,177 A | 4/1991 | Grice | 280/482 |
| 5,039,272 A * | 8/1991 | Holmes et al. | 414/563 |
| 5,217,242 A | 6/1993 | Thomas | 280/482 |
| 5,476,279 A | 12/1995 | Klemesten | 280/415.1 |
| 5,511,813 A | 4/1996 | Kravitz | 280/495 |
| 5,593,171 A | 1/1997 | Shields | 280/479.2 |
| 5,620,198 A | 4/1997 | Borchers | 280/507 |
| 5,630,606 A | 5/1997 | Ryan | 280/479.3 |
| 5,725,231 A | 3/1998 | Buie | 280/455.1 |
| 5,727,805 A | 3/1998 | La Roque | 280/478.1 |
| 5,873,594 A | 2/1999 | McCoy et al. | 280/491.5 |
| 5,884,930 A | 3/1999 | Cluth | 280/497 |

FOREIGN PATENT DOCUMENTS

| DE | 4115812 | 11/1991 | |
|---|---|---|---|
| FR | 2513576 | 4/1983 | B60D/1/06 |
| WO | WO 94/19205 | 9/1994 | B60D/1/52 |

* cited by examiner

Primary Examiner—Avraham Lerner
(74) Attorney, Agent, or Firm—R. Reams Goodloe, Jr.

(57) ABSTRACT

A high strength trailer hitch. The hitch is affixed to the rear of a towing vehicle. The apparatus includes a frame having a transversely extending tubular structural member extending between a first end and a second end and having a front, a rear, a bottom, and a top. A rearwardly extending first tubular receiving member is provided with its forward end affixed to the rear of the transverse tubular structural member. A second tubular receiving member is provided mounted below the first tubular receiving member. An upper forward portion of the second tubular receiving member is affixed below the transverse structural member. A first and a second tubular tow bar inserts are provided in said first and said second tubular receiving members, respectively. A first strengthening stay and a second strengthening stay are affixed between the rearward end of tow bar inserts and the transverse tubular member, to provide high strength against lateral movement of the first and second tow bar inserts.

17 Claims, 4 Drawing Sheets

HIGH STRENGTH EXTENDED LENGTH TRAILER HITCH

This application is a continuation-in-part of copending application(s) application no. 09/329,961 filed on Jun. 9, 1999. U.S. Pat. No. 6,173,984.

FIELD OF THE INVENTION

My invention relates to a hitch for installation on a towing vehicle, and more particularly to a novel, improved high strength trailer hitch design.

BACKGROUND

It is often desirable to tow trailers, such as boat trailers, horse trailers, utility trailers, or other equipment, behind a motor vehicle. Typically, a pickup truck on which a rearwardly extending camper has been installed is utilized as the towing vehicle. In such situations, the extension of the camper beyond the bumper location of the vehicle becomes problematic for towing a trailer behind the truck. Historically, towing hitches provided by others that have been employed in such applications have been designed using an attachment between the hitch and the bumper, and/or between the hitch and the camper. However, the additional complexity in such hook-ups adds undesirably to the cost of such hitches, as well as effectively limits or at least discourages their distribution by mail order or Internet "E-commerce" applications.

I am aware of various attempts in which an effort has been made to provide an improved towing hitch that is useful in the aforementioned situations. However, most hitches previously employed for such applications have been relatively weak, both with respect to lateral movement, and with respect to maximum hitch loading. Even in the designs which have attempted to provide additional resistance to lateral movement, such as is shown by Sorensen in U.S. Pat. No. 4,202,562, issued May 13, 1980 for a Trailer Hitch, the necessity for and extra costs of the attachment of struts or support bars arises. Consequently, the various prior art hitches of which I am aware have considerable shortcomings. Thus, the advantages of my simple, high strength dual tubular tow bar design, with improved lateral stays that can be field installed without the necessity for welding, are important and self-evident.

SUMMARY

I have now invented and disclose herein a novel, improved trailer hitch. The hitch is especially useful for towing trailers behind vehicles having campers with an extended overhang, without the necessity of field welding of stay-bars, struts, or hanger brackets, or other such extension devices. My new trailer hitch includes a main frame having a transversely extending tubular structural member. The transversely extending tubular structural member extends between a first end and a second end (i.e., a left end and a right end). It may be convenient to consider the hitch orientation by utilizing the same orientation for reference as used with respect to a towing vehicle that has a front, a rear, a bottom, a top, a left side, and a right side. A first tubular receiving member is provided having a forward end affixed to the rear of the transversely extending tubular structural member. The first tubular receiving member extends rearwardly along a central axis to a first mouth portion. A second tubular receiving member is mounted below the first tubular receiving member. The second tubular receiving member has a forward end, and extends rearwardly along a central axis to a second mouth portion. The second tubular receiving member also has an upper forward portion that is affixed to the bottom of the transversely extending tubular structural member. A structurally strengthening bottom plate may be provided to strengthen the joint between the second tubular receiving member and the transverse tubular structural member. The structurally strengthening bottom plate has a base portion with an upper surface, and an upwardly extending forward portion. The upwardly extending forward portion of the bottom plate is affixed to the front of the transverse structural member, as well as to the forward end of the second tubular receiving member.

A pair of opposing frame mounts is provided to attach the hitch to a towing vehicle. One of the frame mounts is affixed proximate the first end of the transverse structural member, and another one of the frame mounts is affixed proximate the second end of the transverse structural member. For improving lateral strength, a pair of stiffening gussets is provided. One of the stiffening gussets is affixed proximate the first end of the transverse structural member between a first one of the frame mounts and the transverse structural member. A second one of the stiffening gussets is affixed proximate the second end of the transverse structural member between a second one of the frame mounts and the transverse structural member, so as to strengthen the overall structure said frame.

A first tubular tow bar insert is provided. The first tubular tow bar insert has a forward end that is removeably engageable and snugly interfitting for sliding insertion into said first tubular receiving member. The first tubular tow bar insert further includes a rearwardly extending hitch receiving end.

A second tow bar insert, preferably tubular, is provided. The second tow bar insert has a forward end which is removably engageable and snugly interfitting for sliding insertion into said second tubular receiving member. The second tow bar insert extends rearwardly along at least a portion of the length of the first tubular receiving member, and more preferably for a substantial portion of the length of the first tubular receiving member.

To join the first and second tubular tow bar inserts, at least two, and preferably two or more downwardly extending generally U-shaped assembly brackets are provided. The downwardly extending generally U-shaped assembly brackets laterally straddle the first and the second tubular tow bar inserts. One or more fasteners are utilized to securely affix each of the generally U-shaped assembly brackets to the first and second tubular tow bar inserts, to thereby provide a substantially rigid tow bar assembly. The substantially rigid tow bar assembly thus provides a unitary, singularly acting, rearwardly extending structural member. In one embodiment, I have found it convenient to provide at least one first fastener through each of the generally U-shaped assembly brackets intermediate the first and second tow bar members, and at least one second fastener below the second tow bar member, so that each of the generally U-shaped assembly brackets is snugly and securely affixed in a desired working location to secure the first and second tow bar members together.

For additional strength, a pair of field adjustable stiffeners is provided. One of the field adjustable stiffeners has a first stiffener end affixed proximate the first end of the transverse structural member, and a second stiffener end affixed proximate the rear end of the first tubular tow bar insert. A second one of the field adjustable stiffeners has a first stiffener end affixed proximate the second end of the transverse structural member, and a second stiffener end affixed proximate the rear end of the first tubular tow bar insert. I have found it convenient to affix an attachment plate at or near the rear end of the first tow bar insert, preferably on the lower reaches thereof, which attachment plate includes laterally extending left and right ear portions for attachment to one of the second stiffener ends of each of the first (right) and second (left) field adjustable stiffeners.

For additional utility, I have also found it convenient to provide a mounting bracket or wiring harness clip affixed to the attachment plate for use in securing wiring and lighting components.

My novel trailer hitch provides a simple, secure device for towing trailers behind pickup trucks having extended campers thereon. The design reduces complexity of field installation when compared to previous designs known to me for trailer hitches in such applications.

BRIEF DESCRIPTION OF DRAWING

In the various figures, like structures may be shown with identical reference numbers, without further discussion thereof.

DESCRIPTION

Figure 1:
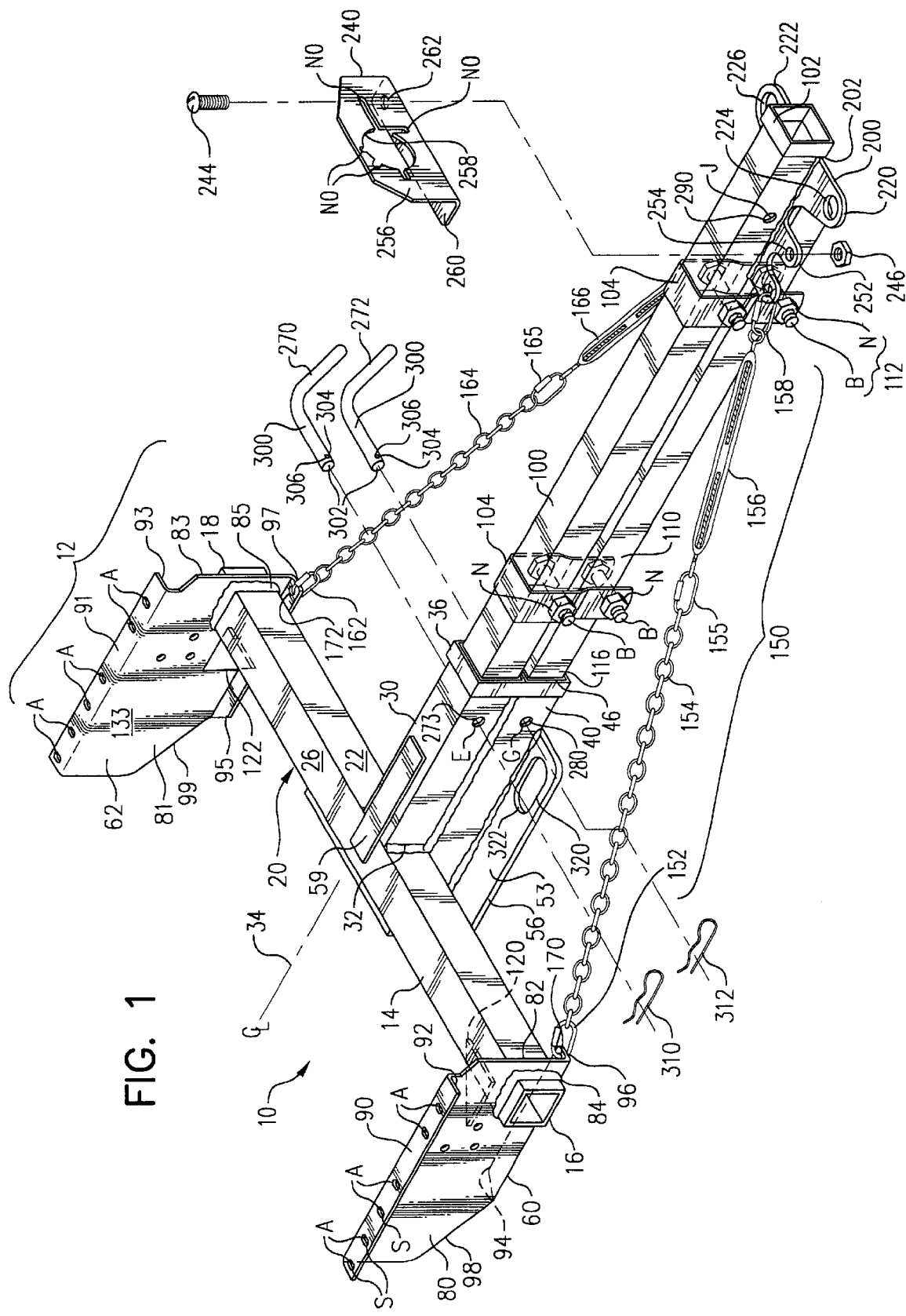
FIG. 1 is a perspective view of my new trailer hitch, showing the strengthened frame, the outwardly oriented and pre-drilled mounting frame flanges, a wiring harness clip, as well as a pair of field adjustable strengthening stays.

Attention is directed to FIG. 1 of the drawing, where my newest high strength towing hitch 10 is illustrated, ready for attachment to a towing vehicle (not shown) . A frame 12 includes a transversely extending structural member 14, preferably square tubular in shape, which extends between a first end 16 and a second end 18. The transversely extending structural member 14 has a front 20, a rear 22, a bottom 24, and a top 26. A first tubular receiving member 30 is provided as a part of frame 12. The first tubular receiving member 30 has a forward end 32 affixed (preferably by welding) to the rear 22 of the transversely extending tubular structural member 14.

The first tubular receiving member 30 extends rearwardly along a central axis centerline 34 to a first mouth portion 36. A second tubular receiving member 40 is mounted below the first tubular receiving member 30. The second tubular receiving member 40 has a forward end 42 having an upper forward portion 50 affixed (preferably by welding) to the bottom 24 of the transversely extending structural member 14. The second tubular receiving member 40 extends rearwardly along central axis centerline 34 to a second mouth portion 46. It is convenient, but not absolutely necessary, that the first mouth portion 36 and the second mouth portion 46 be vertically aligned one below the other.

Figure 4:
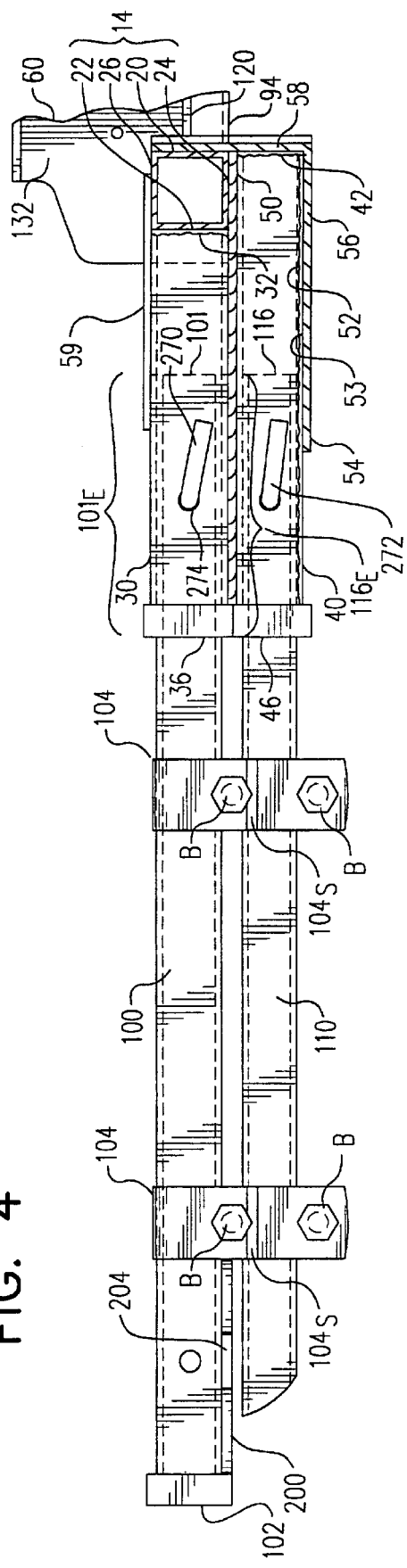
FIG. 4. is a side elevation view, with a partial cross-section through the transverse structural member, showing the structural configuration of the first and second tubular receiving members, and their attachment to each other and to the transverse structural member, as well as the first and second tubular tow bar members removeably affixed in a working position in the first and second tubular receiving members.

As better seen in FIG. 4, the second tubular receiving member 40 has a bottom portion 52 which is affixed (preferably by welding) to the upper surface 53 of the base portion 54 of structurally strengthening bottom plate 56. The structurally strengthening bottom plate 56 is preferably provided in an L-shape, with a base portion 54 and an upwardly extending forward portion 58 affixed to the front 20 of the transversely extending structural member 14 and to the front 42 of the second tubular receiving member 40, in order to provide longitudinal strength of the hitch, both in tension and compression, as well as to strengthen the first and second tubular receiving members against lateral movement.

Also, a strengthening strap 59 is provided, preferably in thin and more preferably in a parallelepiped shape, and is securely affixed (preferably by welding) to the upper surface 26 of the transversely extending structural member 14 and to the first tubular receiving member 30. Preferably, the strengthening strap 59 and the other various components of frame 12 are welded together to provide a high strength frame 12, however, other assembly or fastening methods may be utilized without departing from the basic design disclosed herein, where strength and fatigue life considerations permit.

Returning to FIG. 1, at least two and preferably a pair of frame mounts 60 and 62 are provided. Specifically, a left frame mount 60 and a right frame mount 62 form a pair of opposing frame mounts for affixing the hitch 10 to a towing vehicle. The left one 60 of the pair of frame mounts is affixed proximate the first end 16 of the transversely extending structural member 14. The right one 62 of the pair of frame mounts is affixed proximate the second end 18 of the transversely extending structural member 14. In one embodiment of my high strength hitch 10, the frame mounts 60 and 62 provide the sole attachment structure for affixing the hitch 10 to a towing vehicle. Thus, the frame mounts 60 and 62 as illustrated in FIG. 1 are depicted as installed in a fully assembled hitch 10. Each of the frame mounts 60 and 62 has a vertically oriented main body portion, namely 80 and 81, respectively. The main body portions 80 and 81 have forward end portions 82 and 83, respectively. Receiving apertures 84 and 85 through frame mounts 60 and 62 are defined by sidewall portions (not shown, covered by weldment in FIG. 1) but in any event are sized and shaped to receive and contain therein a selected end of the transversely extending structural member 14. The upper mounting flange portion 90 of frame mount 60 has a forward end 92. The upper mounting flange portion 91 of frame mount 62 has a forward end 93. The lower strengthening flange portion 94 of frame mount 60 has a forward end portion 96. The lower strengthening flange portion 95 of frame mount 62 has a forward end portion 97. For various reasons, including strength, I have found it advantageous to provide the main body portion 80 or 81 of frame mounts 60 and 62 with a sloping forward portion 98 and 99, respectively, where the sloping forward portion 98 defines at least a portion of the shape of the said frame mounts 60 or 62 between the upper (90 or 91) mounting flange portions and the lower (94 or 95) strengthening flange portions, respectively. Preferably, the sloping forward portions 98 or 99 are adapted to allow the lower strengthening flange portions 94 or 95 to be shorter than the upper mounting flange portions 90 or 91.

I have found that for ease of assembly, it is preferable that the upper mounting flange portions 90 and 91 be outwardly directed to the left and right, respectively. Also, I have found it advantageous to provide pre-drilled mounting cutout apertures A defined by sidewall portions S, rather than provide flat flanges 90 or 91 without prefabricated cutout apertures as I manufactured in my prior art hitch designs. Depending upon the nature of the vehicle frame to which the frame mounts 60 and 62 are being affixed, the pre-fabricated cutout apertures A may be square shaped apertures, or round shaped apertures, or oval shaped apertures, or ovoid shaped apertures.

Turning now to FIG. 4, the first tubular tow bar 100 has a forward end 101 that is removeably engageable and snugly interfitting for sliding insertion along engagement portion $101_E$ of the first tubular receiving member 30. The first tubular tow bar 100 also has a rearwardly extending hitch receiving portion 102.

Figure 3:
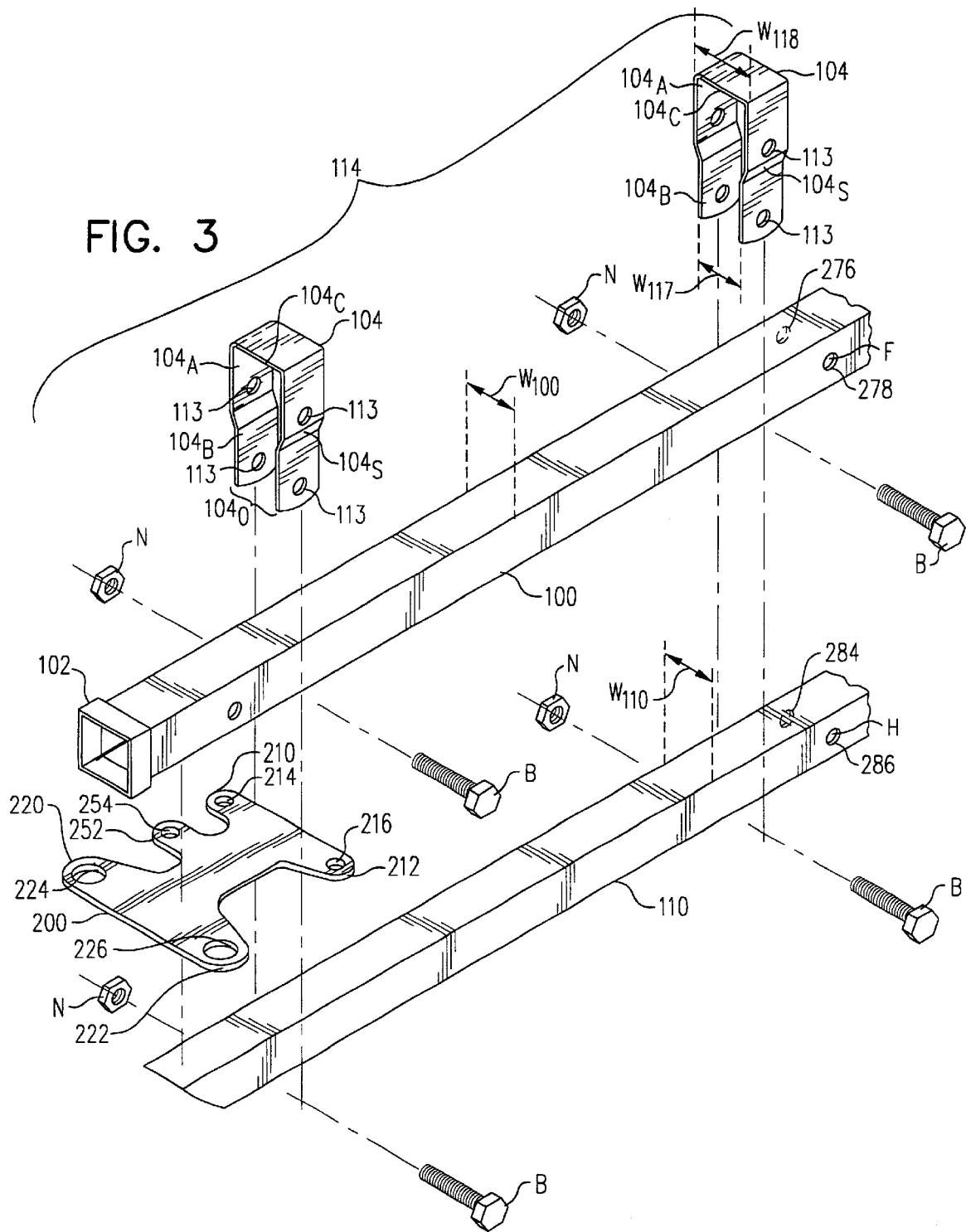
FIG. 3 is an exploded perspective view showing the assembly of the first and second tubular tow bar members into a unitary structural towbar extension member by use of mounts, here shown as generally U-shaped assembly brackets; also shown is the use of an attachment plate located between the first and second tubular tow bar members for securing field adjustable strengthening stays.

One or more mounts, preferably in the form of two or more assembly brackets 104, are utilized to securely affix the first tubular tow bar 100 to a second tubular tow bar 110. In the embodiment shown in additional detail in FIG. 3, brackets 104 are provided in a downwardly extending generally square ended U-shaped design. Thus, brackets 104 are utilized to straddle the first tubular tow bar 100 as well as a second tubular tow bar 110, and thus in combination with use of fasteners 112 (such as bolts B and nuts N extending through apertures defined by sidewalls 113), the second tubular tow bar 110 and the first tubular tow bar 100 are joined into a singularly acting high strength unitary structural extension member 114. As illustrated in FIG. 3, note that brackets 104 preferably include a pair of opposing first receiving portions $104_A$ and a pair of second receiving portions $104_B$, with opposing converging sidewall portions $104_S$, to assist in wedging and securing the first tubular tow bar 100 with the brackets 104, and thus effectively prevent relative movement between the first tubular towbar 100 and the second tubular tow bar 110.

Like the first tubular towbar 100, the second tubular towbar 110 has a forward end 116 that is removeably engageable and snugly interfitting for sliding insertion along engagement portion $116_E$ into the second tubular receiving member 40.

I have found it advantageous to provide a singularly acting high strength unitary structural extension member 114 in which first tow bar 110 and second tow bar 110 are of slightly different sizes. More particularly, I have found it convenient to provide a first tow bar 100 which is of width $W_{100}$, and a second tow bar 110 of width $W_{110}$, wherein $W_{100}$ is greater than $W_{110}$. Therefore, it should be noted that assembly brackets 104 have successive side portions $104_A$ and $104_B$ of width $W_{117}$, and width $W_{118}$, wherein width $W_{117}$ is complementary to $W_{100}$, and width $W_{118}$ is complementary to $W_{110}$, and wherein inwardly sloping side walls $104_S$ narrow the width between side portions $104_A$ and $104_B$ when assembly brackets 104 are examined from their interior closed end $104_C$ to the exterior open end $104_O$.

My improved high strength hitch 10 preferably utilizes at least two stiffening gussets 120 and 122, to improve the structural strength against lateral resistance. Preferably, a first one 120 of the stiffening gussets is provided in a generally triangular shape and affixed proximate the first end 16 of the transverse structural member 14, between the right side 132 of frame mount 60 and the transverse structural member 14. A second one 122 of the stiffening gussets is provided in a generally triangular shape and affixed proximate the second end 18 of the transverse structural member 14, between the left side 133 of frame mounts 62 and the transverse structural member 14. In this way, the frame structure 12 of hitch 10 is stiffened against bending moment forces and against compressive, forwardly directed forces, such as might be experienced during a collision of an object with the towed vehicle or with the towing vehicle.

For additional strength against bending and twisting forces, I have also found it advantageous to provide a lower flange portion 94 and 95 on frame mounts 60 and 62, respectively. It is preferably but not essential that the lower flange portions 94 and 95 are inwardly directed, toward the centerline 34 and away from the first 16 and second 18 ends of the transversely extending structural member 14. In any case, lower flange portions 94 and 95 are preferably oriented opposite the direction of the companion upper mounting flange portions 90 and 91 of their respective frame mount 60 or 62.

Figure 2:
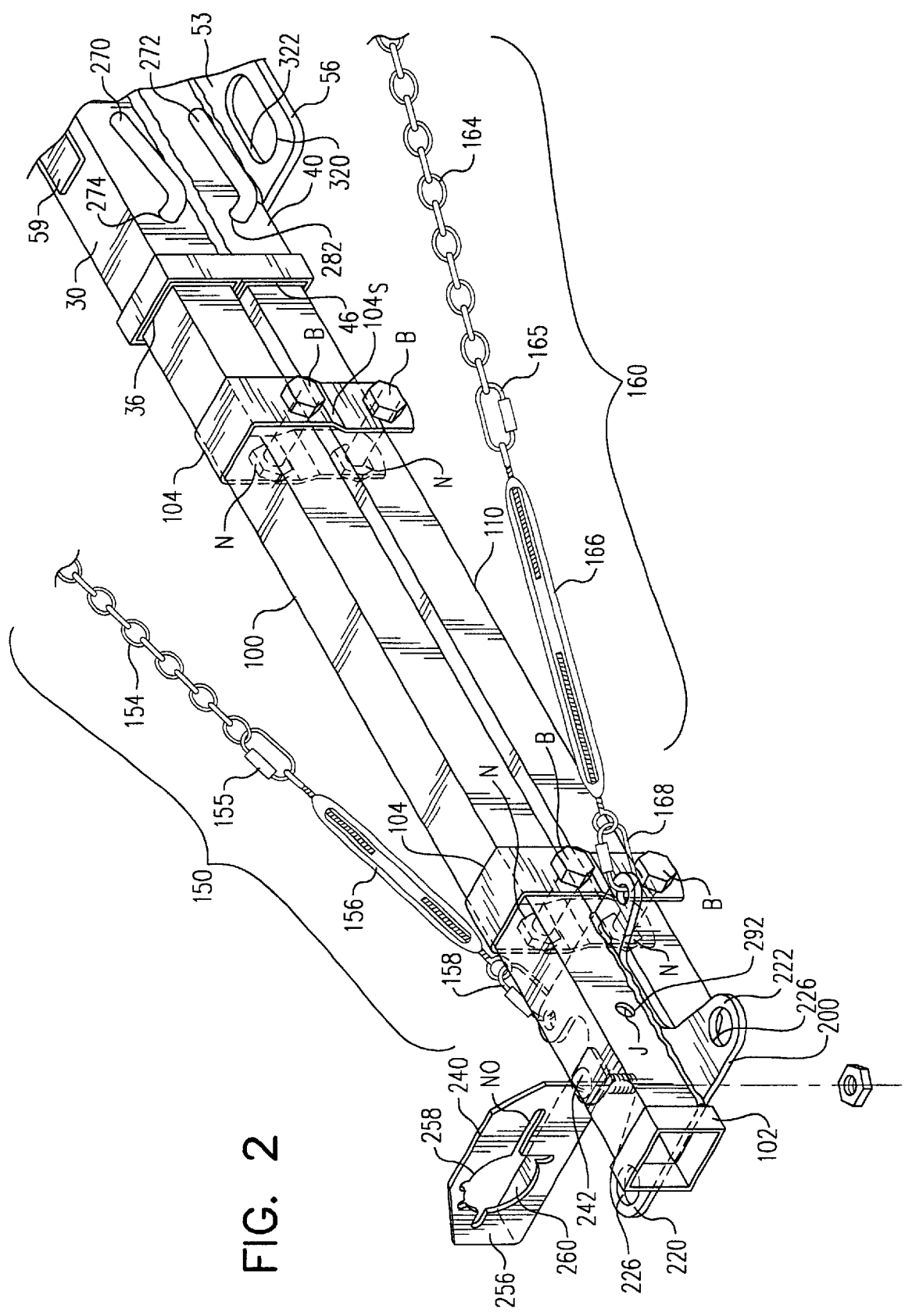
FIG. 2 is a perspective view of the rear, hitch insert end of a first tubular tow bar, and shows the use of an attachment plate for affixing the field adjustable strengthening stays.

As better seen by comparing FIGS. 1 and 2, in order to completely secure the first 100 and second 110 tow bar inserts against lateral movement, and tightly affix them into the first and second tubular receiving members 30 and 40, respectively, I have found it advantageous to provide a first 150 and a second 160 field adjustable stiffener or strengthening stay assembly. This assembly provides an overall "A-Frame" type shape that is advantageous in providing high structural strength. The first or left strengthening stay assembly 150 includes a forward end adjustable link 152, a chain portion 154, an intermediate adjustable link 155, an adjustable turnbuckle 156 and a rearward adjustable link 158. The second or right field adjustable strengthening stay assembly includes a forward end adjustable link 162, a chain portion 154, an intermediate adjustable link 165, an adjustable forged turnbuckle 166, and a rearward adjustable link 168. Forward end adjustable links 152 and 162 are affixed to lower flanges 94 and 95, respectively, at stay mounting apertures defined by edgewall portions 170 and 172, respectively. The various "adjustable links" just described (e.g., 155, 165) are sometimes known as clevis links or quick links, but are commonly utilized with chains to provide a strong, wrench tightenable, insertable chain link as an end connector for a length of chain. Although I prefer the use of nominally sized 5/16 inch size locking clevis links, any convenient size attachment links may be utilized as appropriate for a particular service.

I have found it convenient to affix (preferably via welding) an attachment plate 200 to first tow bar insert 100, at or near the rear end 202 of the first tow bar insert 100, preferably on the lower reaches 204 thereof. The attachment plate 200 includes laterally extending left stay attachment 215 ear portion 210 and right stay attachment ear portion 212. Preferably, a left aperture defined by a left ear interior sidewall 214 provides a location for secure attachment of attachment link 158 of the left field adjustable stiffener stay assembly 150. A right aperture defined by a right ear interior edge wall 216 provides a location for attachment of attachment link 168 of the right field adjustable stiffener stay assembly 160.

The generally long and thin elongated attachment plate 200 also preferably includes left and right rear attachment ear portions 220 and 222 respectively. Left rear attachment ear portion 220 has an aperture defined by a left rear interior edge wall 224 for attachment of a safety chain (not shown). Similarly, right rear attachment ear portion 222 has an aperture defined by a right rear interior edge wall 226 for attachment of a safety chain (not shown).

I have also found it useful to provide a plug bracket 240, for affixing electrical lines and plugs between the towed trailer and the towing vehicle. The plug bracket 240 is preferably affixed, normally by attachment fastener 242 such as screw 244 and nut 246 (or by welding) to one side (left side shown) of attachment plate 200 at bracket attachment ear 252. Bracket attachment ear has an aperture therethrough defined by sidewall portion 254 adapted to accept therethrough fastener 242 (e.g., screw 244). The plug bracket includes an upstanding flange 256 with a plug accepting interior sidewall 258 having a plurality of notches N therein adapted to receive and secure various plugs (not shown). Also, the plug bracket 240 has a lower mounting flange 260 having a mounting aperture therethrough defined by mounting sidewall 262.

For securing the first and second tow bar inserts 100 and 110, generally L-shaped locking pins 270 and 272 are provided. In order to utilize the locking pin 270, the first tubular receiving member 30 further includes a pair of horizontally spaced apart first and second sidewall apertures 273 and 274, each of which are defined by edgewall portions E. Similarly, the first tubular tow bar 100 has a companion pair of horizontally spaced apart third 276 (shown in hidden lines in FIG. 3) and fourth 278 sidewall apertures, and each of the third 276 and fourth 278 sidewall apertures are also defined by edgewall portions F. The first 273, second 274, third 276, and fourth 278 sidewall apertures are of comparable size and adapted for alignment to receive therethrough in close fitting engagement the generally L-shaped locking pin 270, so as to lock the first tubular tow bar 100 to the first tubular receiving member 30 to thereby prevent forward or rearward movement along the axis of insertion of the first tubular tow bar 100 into the first tubular receiving member 30.

In order to utilize the locking pin 272, the second tubular receiving member 40 further includes a pair of horizontally spaced apart first and second sidewall apertures 280 and 282, each of which are defined by edgewall portions G. Similarly, the second tubular tow bar 110 has a companion pair of horizontally spaced apart third 284 and fourth 286 sidewall apertures, and each of the third 284 and fourth 286 sidewall apertures are also defined by edgewall portions H. The first 280, second 282, third 284, and fourth 286 sidewall apertures are of comparable size and adapted for alignment to receive therethrough in close fitting engagement the generally L-shaped locking pin 272, so as to lock the first tubular tow bar 100 to the first tubular receiving member 30 to thereby prevent forward or rearward movement along the axis of insertion of the first tubular tow bar 100 into the first tubular receiving member 30.

In addition to the locking pins 270 and 272 just described, a similar locking pin 200 is provided for use in =affixing a selected hitch H (not shown, but same as shown in hidden lines in FIG. 1) to the mouth 102 of the first tow tubular tow bar 100. In that arrangement, the first tubular tow bar 100 has fifth 290 and sixth 292 sidewall apertures; each of said fifth 290 and sixth 292 sidewall apertures are defined by edgewall portions J, and a selected hitch insert has complementary horizontally spaced apart seventh and eighth sidewall apertures defined by edgewall portions, and all of the fifth, sixth, seventh, and eighth sidewall apertures are of comparable size and are adapted for receiving the another generally L-shaped locking pin similar to pins 270 or 272, in a pre-selected locking location, so that the selected hitch insert is locked to the first tubular tow bar 100.

To secure the locking pins 270 or 272, such locking pins utilize a cylindrical main body 300 having a longitudinal axis. Proximate to the distal end 302 of the main body 300, the locking pin has a securing pin aperture 304 defined by an interior sidewall 306. The securing pin sidewall 306 is preferably oriented transverse to the longitudinal axis of the cylindrical main body 300. Securing pins 310 and 312 are provided are adapted for secure engagement in part through the apertures 304 and in part spring biased against the cylindrical main body 300, so as to secure the locking pins 270 and 272 against disengagement from a pre-selected locking location.

In the embodiment shown in FIGS. 1 and 2, I have also provided in the base portion 54 of structurally strengthening bottom plate 56 several chain receiving apertures 320. The chain receiving apertures are defined by vertically oriented sidewall portions 322. Preferably, the inner sidewall portions 322 of the chain receiving apertures 320 are spread laterally outwardly beyond the first tubular receiving member It is to be appreciated that the novel trailer hitch provided by the present invention is a significant improvement in the state of the art of towing hitches. My novel hitch designs are relatively simple, and it substantially decreases the cost and complexity involved in affixing a trailer hitch to a towing vehicle.

It is thus clear from the heretofore provided description that my novel trailer hitch designs, which can be easily mounted on a towing vehicle, are an appreciable improvement in the state of the art of devices for trailer hitches. Although only a few exemplary embodiments of this invention have been described in detail, it will be readily apparent to those skilled in the art that the my novel trailer hitches may be modified from those embodiments provided without materially departing from the novel teachings and advantages provided by this invention, and may be embodied in other specific forms without departing from the spirit or essential characteristics thereof. Thus, it is to be understood that although the hitch has been presented with square type tubular configurations, round tubular configurations may be utilized to provide equivalent results. Also, my hitches can be provided with various size tubes, such as a nominal two inch (2") tube for Class III type hitches, or in a nominal 1¼ inch (1.25") tube for Class II type hitches. Therefore, the embodiments presented herein are to be considered in all respects as illustrative and not restrictive. As such, the claims are intended to cover the structures described herein and not only structural equivalents thereof, but also equivalent structures. Thus, the scope of the invention, as indicated by the appended claims rather than by the foregoing description, is intended to include variations from the embodiments provided which are nevertheless described by the broad meaning and range properly afforded to the language of the claims, or to the equivalents thereof.

What is claimed is:

1. A towing hitch for attachment to the rear of a towing vehicle, said hitch comprising:
(a) a frame, said frame comprising
(i) a transversely extending tubular structural member, said structural member extending between a first end and a second end, and having (A) a front, (B) a rear, (C) a bottom, and (D) a top,
(ii) a first tubular receiving member, said first tubular receiving member
(A) further comprising a forward end affixed to said transversely extending tubular structural member, and
(B) extending rearwardly along a central axis to a first mouth portion,
(iii) a second tubular receiving member, said second tubular hitch receiver mounted below said first tubular receiving member, and having (A) a forward end, and (B) extending rearwardly along a central axis to a second mouth portion, said second tubular receiving member having (A) a bottom portion, and (B) an upper forward portion, wherein said upper forward portion is affixed to said bottom of said transversely extending tubular structural member, (iv) a bottom plate, said bottom plate comprising (A) a base portion having an upper surface, and (B) an upwardly extending forward portion, and (C) wherein said upwardly extending forward portion of said bottom plate is affixed to (1) the front of said transverse structural member, and (2) the forward end of said second tubular hitch receiver, and (D) wherein said upper surface of said base portion is joined to said bottom portion of said second tubular hitch receiver;

(v) at least two frame mounts, one of said at least two frame mounts affixed proximate said first end of said transverse structural member, and one of said at least two frame mounts affixed proximate said second end of said transverse structural member;

(b) a first tubular tow bar insert, said first tubular tow bar insert removeably engageable and snugly interfitting for sliding insertion into said first tubular receiving member, said first tubular tow bar insert further comprising (i) a rearwardly extending hitch receiving portion, (c) a second tubular tow bar insert, said second tubular tow bar insert removeably engageable and snugly interfitting for sliding insertion into said second tubular receiving member, (d) mounts securely affixing said first tubular to bar insert to said second tubular tow bar insert as a singular structural member;

(e) a first strengthening stay, said first stay
  (i) having a rearward end attached adjacent said rearward end of said first or of said second tubular tow bar, and (ii) having a forward end attached adjacent said first end of said transverse structural member;
(f) a second strengthening stay, said second strengthening stay
  (i) having a rearward end attached adjacent said rearward end of said first or of said second tubular tow bar, and (ii) having a forward end attached adjacent said second end of said transverse structural member.

2. The hitch as set forth in claim 1, further comprising a pair of stiffening angle gussets, one of said stiffening angle gussets affixed proximate said first end of said transverse structural member between a first one of said frame mounts and said transverse structural member, and a second one of said stiffening angle gussets affixed proximate said second end of said transverse structural member between a second one of said frame mounts and said transverse structural member, so as to strengthen the structure said frame.

3. The hitch as set forth in claim 1, wherein each of said frame mounts further comprises an upper mounting flange portion.

4. The hitch as set forth in claim 3, wherein each of said upper mounting flange portions is outwardly flanged away from said first and said second ends of said transverse structural member.

5. The hitch as set forth in claim 3, or in claim 4, wherein said upper mounting flange portion further comprises a plurality of pre-drilled mounting apertures, each of said plurality of pre-drilled apertures defined by sidewall portions.

6. The hitch as set forth in claim 1, or in claim 3, wherein each of said frame mounts further comprises a lower flange portion.

7. The hitch as set forth in claim 6, wherein each of said lower flange portions extends inwardly from said first and said second ends of said transverse structural member.

8. The hitch as set forth in claim 1, wherein said mount affixing said first tubular tow bar and said second tubular tow bar further comprises one or more generally U-shaped mounting brackets, each of said one or more generally U-shaped mounting brackets shaped for transverse mounting across in close fitting engagement with said first and said second tubular tow bar inserts.

9. The hitch as set forth in claim 8, wherein each of said generally U-shaped mounting brackets further comprises one or more mounting bolts said one or more mounting bolts each adapted to threadingly accept a tightening nut for firmly affixing said one or more generally U-shaped bracket to said first and to said second tubular tow bar inserts.

10. The hitch as set forth in claim 9, comprising at least two generally U-shaped mounting brackets.

11. The hitch as set forth in claim 1, further comprising a first generally L-shaped locking pin, and
  (a) wherein said first tubular receiving member further comprises horizontally spaced apart first and second sidewall apertures, each of said first and second sidewall apertures defined by edgewall portions, and
  (b) wherein said first tubular tow bar insert comprises horizontally spaced apart third and fourth sidewall apertures, each of said third and fourth sidewall apertures defined by edgewall portions, and
  (c) wherein said first, second, third, and fourth sidewall apertures are of comparable size and adapted for receiving said generally L-shaped locking pin in a pre-selected locking location to lock said first tubular tow bar to said first tubular receiving member against forward or rearward movement along the axis of insertion of said first tubular tow bar insert into said first tubular receiving member.

12. The hitch as set forth in claim 11, further comprising a second generally L-shaped locking pin, and
  (a) wherein said second tubular tow bar insert further comprises horizontally spaced apart fifth and sixth sidewall apertures, each of said fifth and sixth sidewall apertures defined by edgewall portions, and
  (b) wherein a second tubular receiving member comprises horizontally spaced apart seventh and eighth sidewall apertures, each of said seventh and eighth sidewall apertures defined by edgewall portions, and
  (c) wherein said fifth, sixth, seventh, and eighth sidewall apertures are of comparable size and are adapted for receiving said second generally L-shaped locking pin in a pre-selected locking location to lock said second tubular tow bar insert to said second tubular receiving member against forward or rearward movement along the axis of insertion of said second tubular tow bar insert into said second tubular receiving member.

13. The hitch as set forth in claim 11 or in claim 12, wherein
  (a) said first or said second generally L-shaped locking pin comprises a cylindrical main body having a longitudinal axis, and wherein said locking pin further comprises a securing pin aperture defined by an interior sidewall, said securing pin aperture oriented transverse said longitudinal axis of said L-shaped locking pin and extending through said cylindrical main body, and
  (b) a securing pin is provided, said securing pin adapted for secure engagement in and with said securing pin aperture of said locking pin, so as to secure said locking pin against disengagement from said pre-selected locking location.

14. The hitch as set forth in claim 1, further comprising an upper reinforcing bar, said upper reinforcing bar generally in an elongated, flat, parallelepiped shape extending between said top side of said transverse structural member and said upper side of said first tubular receiving member, so as to strengthen the joint therebetween.

15. The hitch as set forth in claim 1, further comprising a bottom strengthening plate, said bottom strengthening plate having an elongated main body with spaced apart chain receiving apertures defined by vertically oriented sidewall portions, said chain receiving apertures spread laterally beyond said first tubular receiving member.

16. The hitch as set forth in claim 1, further comprising a plug bracket, said plug bracket affixed to a said first tubular tow bar.

17. The hitch as set forth in claim 16, wherein said plug bracket further comprises a plurality of receiving notches therein.

* * * * *